(12) United States Patent
Prosser et al.

(10) Patent No.: US 6,301,652 B1
(45) Date of Patent: Oct. 9, 2001

(54) INSTRUCTION CACHE ALIGNMENT MECHANISM FOR BRANCH TARGETS BASED ON PREDICTED EXECUTION FREQUENCIES

(75) Inventors: Edward Curtis Prosser, NE Rochester, NY (US); Robert Ralph Roediger; William Jon Schmidt, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 780 days.

(21) Appl. No.: 08/593,309

(22) Filed: Jan. 31, 1996

(51) Int. Cl.[7] ................. G06F 9/40; G06F 9/44
(52) U.S. Cl. ............ 712/204; 712/207; 712/220; 712/221; 717/3; 717/5; 717/9
(58) Field of Search ................. 395/701–706, 395/709–710, 500, 183.14, 183.15; 712/204–207, 209–211, 215, 220–221, 300; 717/2–3, 5–9

(56) References Cited

U.S. PATENT DOCUMENTS

| | | | |
|---|---|---|---|
| 4,860,197 | 8/1989 | Langendor et al. | 712/238 |
| 5,212,794 | 5/1993 | Pettis et al. | 717/9 |
| 5,303,377 * | 4/1994 | Gupta et al. | 717/9 |
| 5,381,533 | 1/1995 | Peleg et al. | 712/215 |
| 5,450,585 * | 9/1995 | Johnson | 717/9 |
| 5,452,457 * | 9/1995 | Alpert et al. | 717/9 |
| 5,530,964 * | 6/1996 | Alpert et al. | 717/9 |
| 5,539,907 * | 7/1996 | Srivastava et al. | 717/5 |
| 5,604,905 * | 2/1997 | Tevanian et al. | 717/6 |
| 5,704,053 * | 12/1997 | Santhanam | 712/207 |
| 5,734,908 * | 3/1998 | Chan et al. | 717/9 |
| 5,930,508 * | 7/1999 | Faraboschi et al. | 712/204 |
| 5,995,992 * | 11/1999 | Eckard | 712/221 |
| 6,070,010 * | 5/2000 | Keenleyside et al. | 712/204 |
| 6,175,909 * | 1/2001 | McBride | 712/204 |

* cited by examiner

Primary Examiner—Bharat Barot
(74) Attorney, Agent, or Firm—Schmeiser, Olsen & Watts

(57) ABSTRACT

A compiler system and method is provided that can 1) generate a second instruction stream from a first instruction stream, 2) read in and process predetermined external information regarding the basic blocks that makes up the second instruction stream and 3) place certain of the basic blocks on cache line boundaries based on predicted execution frequencies. In particular, the compiler system and method utilize profile information containing predicted block execution or edge-weight execution frequencies to determine which of the basic blocks to align on cache line boundaries. One method for obtaining profile information includes precompiling the source code, creating an executable program, executing the program with test inputs, and outputting a profile containing execution frequency information. Once the profile information is obtained, the source code can then be recompiled using the profile information. The compiler can then selectively cache align those blocks identified as important.

34 Claims, 5 Drawing Sheets

INSTRUCTION CACHE ALIGNMENT MECHANISM FOR BRANCH TARGETS BASED ON PREDICTED EXECUTION FREQUENCIES

FIELD OF THE INVENTION

The present invention relates to computer processing systems which utilize instruction caches. More particularly, the present invention relates to a compiler system and method which include an instruction cache alignment mechanism.

BACKGROUND OF THE INVENTION

The development of the EDVAC computer system of 1948 is often cited as the beginning of the computer era. Since that time, computer systems have found their way into just about every aspect of the American lifestyle. One reason for this proliferation is the ability of computer systems to perform a variety of tasks in an efficient manner. Efficiency is achieved because computer systems provide a means wherein easily modifiable computer programs (i.e., software) can instruct the computer system's electronic components (i.e., hardware) how to act. Thus, it is the computer program, which contains a sequence of unique instructions, that allows the computer system's hardware to function in many different ways.

While computer system hardware has evolved greatly over the years to provide faster and more powerful systems, the fundamental elements that make up a computer system have not changed. Probably the most critical of these elements is the central processing unit (CPU) which reads in and processes computer program instructions and directs the various hardware components to act in a specified manner. Another critical hardware element is computer memory which provides a location wherein computer programs can be stored as they are being processed by the CPU. Together, the CPU and computer memory represent the backbone of computer system hardware by providing a flexible means for the computer system to utilize software programs.

Over the years, the continual desire to use larger, faster and more complex software programs have forced CPU manufacturers to constantly improve the rate at which instruction are executed, and, has likewise forced memory manufactures to constantly improve the rate at which memory can deliver instructions to the CPU. However, the cost of providing higher speed CPU's has decreased much faster than the cost of computer memory. Thus, a disparity between the two now exists such that today's CPU's often are able to execute instructions much faster than the instructions can be retrieved from the computer's memory.

To alleviate the disparity between the high operational speeds of CPU's and the slower access times of instruction memories, present computer systems include an intermediate memory unit, or high speed cache memory, between the central processing unit and the computer's main memory. Cache memory provides a high speed memory repository wherein instructions and/or data can be made more readily available to the CPU without introducing a processing delay.

While cache memories do help to alleviate the speed disparity mentioned above, use of cache memory is limited because of the relatively high cost associated therewith. Thus, cache systems cannot replace main memory and in most cases, cannot hold a complete program. Because of this limitation, computer systems must make decisions regarding which program instructions to place and keep in cache memory. In general, most computer systems utilize methods such that groups of soon to be needed program instructions continuously get loaded into the cache. Only instructions and data that have been used recently are likely to remain in the cache since older instructions and data will be cast out to make room for newer instructions and data. Efficient cache management therefore becomes of critical importance in ensuring that computer systems operate at full speed.

An instruction cache typically is made up of "lines" of cache memory, each of which is capable of storing a predetermined number of bytes corresponding to a sequence of instructions from a program. The first instruction in each cache line is said to reside on a cache line boundary. When the CPU requests an instruction, the request is directed to the cache. If the instruction in question is already in the cache, it is returned to the CPU. If it is not in the cache, the cache is loaded with a "line" of instructions from main memory that includes the one requested. As long as the cache can be filled with soon-to-be-executed instructions, the CPU need never slow down. In other words, the cache allows the CPU to operate at full speed without having to wait for instructions to be "fetched" from the main memory.

In general, program instructions get read into the cache line-by-line. As far as the cache is concerned, every executable program is essentially mapped into a series of fixed-length lines. For example, if a system employed a cache in which cache lines were 16 bytes long, the first 16 bytes of a program (0000–0015) may be mapped into a first line, the next 16 bytes (0016–0031) would be mapped into the next line, etc. Typically, each 16-byte line of the program in main memory, once loaded into cache memory, will begin on a cache line boundary and fill the entire line.

Although the cache memory increases efficiency of computer systems, its usefulness can diminish when it gets filled with instructions that will never be executed. Instructions that get read into the cache but never executed are said to cause cache pollution. Cache pollution often occurs when a non-sequential path is taken such as when a call, branch or jump instruction (i.e., an instruction that directs the CPU to execute in a non-sequential manner) is executed. To illustrate how this might occur, consider the following example. In accordance with the above 16-byte cache line example, if, during program execution, there is a branch to memory location 0070, the next cache line would be loaded with the portion of the program residing between bytes 0064–0079. If bytes 0064–0069 were not executed in the near future, they would represent an example of cache pollution.

Executable software programs are typically created by compilers without giving thought to cache operation. A compiler is the device for translating one representation of a program into another, usually translating source code written by humans into instructions that can be executed on a particular computer. The output of the compiler generally contains machine level instructions arranged in basic blocks. Each basic block (or block) contains a subset of program instructions suitable for sequential execution by the CPU. Each block typically begins with a label which corresponds to the memory address at which the block is stored. All of the blocks of an executable program are typically stored contiguously in the slower main memory of the computer.

When the CPU branches to a block that is not presently in the cache, that block must be read into the cache. Depending on where that block exists in main memory, the block may begin at any location in a cache line. Chances are that the block will not get loaded into the cache such that the block begins on a cache line boundary. The result is that the instructions immediately prior to the block will also be inserted into the cache line, potentially creating cache pollution. In an effort to address this problem, known compiler methods place certain blocks on cache line boundaries in order to reduce pollution within the cache. Such methods involve hard-coding the compiler with a generic decision mechanism to automatically boundary align blocks that are recognized as certain generalized types of blocks. In particular, these methods focus on certain programming constructs, such as if-then-else and conditional branch statements which generally cause jump or branch instructions to be generated. As noted above, when such jump or branch instructions are encountered by the central processing unit, the sequential ordering of instruction execution is broken and a nonadjacent block of instructions targeted by the branch must be read into the cache (if not already present). By placing certain of those branch targets on cache line boundaries, cache line pollution is potentially reduced.

Unfortunately, under these methods, there is no way to be certain that one block is more likely to be executed than another. As a result, overhead may be severely increased as numerous undesired padding instructions or no-op instructions get inserted into memory. (A no-op instruction is any instruction whose execution by the processor has no effect on the program's semantics.) Thus, the compiler must decide by itself which blocks to boundary align. Since such heuristics or "repositioning rules" have no direct correlation to actual execution paths exercised in the source code program being compiled, there is no guarantee that blocks that are being boundary aligned will increase cache efficiency. Moreover, there is no guarantee that the aligned blocks will ever even get executed. Thus, without a way of better identifying which blocks should be boundary aligned, performance of computer systems will be impaired.

SUMMARY OF THE INVENTION

The present invention comprises a compiler system and method that can 1) generate a second instruction stream from a first instruction stream, 2) read in and process predetermined external information regarding the basic blocks that makes up the second instruction stream and 3) place certain of the basic blocks on cache line boundaries based on predicted execution frequencies. Under the preferred embodiment, the compiler system and method utilize profile information containing block execution or edge-weight execution frequencies to determine which of the basic blocks to align on cache line boundaries. One particular method for obtaining profile information includes pre-compiling the source code (i.e., the first instruction stream), creating an executable program, executing the program with test inputs, and outputting a profile containing execution frequency information. Once the profile information is obtained, the source code can then be recompiled using the profile information. The compiler can then cache align those blocks identified as important in the profile information.

Other types of predetermined external information may include user specified block alignment information or heuristic algorithms capable of directing the compiler to cache align certain blocks. When a block is cache aligned, it is positioned to begin at the next cache line boundary in the instruction stream. This may leave a gap between the last instruction of the textually preceding block and the first instruction of the aligned block. If the preceding block does not end with an unconditional branch, control will "fall through" from the preceding block into the gap. There are two ways of preventing this—either the gap may be filled with no-op instructions, or the first instruction in the gap may be filled with an unconditional branch to the first instruction of the aligned block. A compiler may select either of these methods at each cache alignment opportunity.

It is therefore an advantage of the present invention to provide a system and method in which a compiler program can read in predetermined external information regarding block execution frequencies of the executable program being created by the compiler.

It is a further advantage of the present invention to provide a compiler system with a mechanism for cache-aligning blocks identified by predetermined external information.

It is a further advantage of the present invention to provide a compiler system and method which can utilize profile information to cache-align certain blocks.

It is a further advantage of the present invention to provide a two-step method for creating executable programs which makes efficient use of cache memory.

It is a further advantage of the present invention to provide a compiler system and method which will reduce cache pollution.

It is a further advantage of the present invention to provide a computer system which allows executable programs to make efficient use of cache memory.

DESCRIPTION OF THE PREFERRED EMBODIMENT

Cache Boundary Alignment—an Overview

Figure 1:
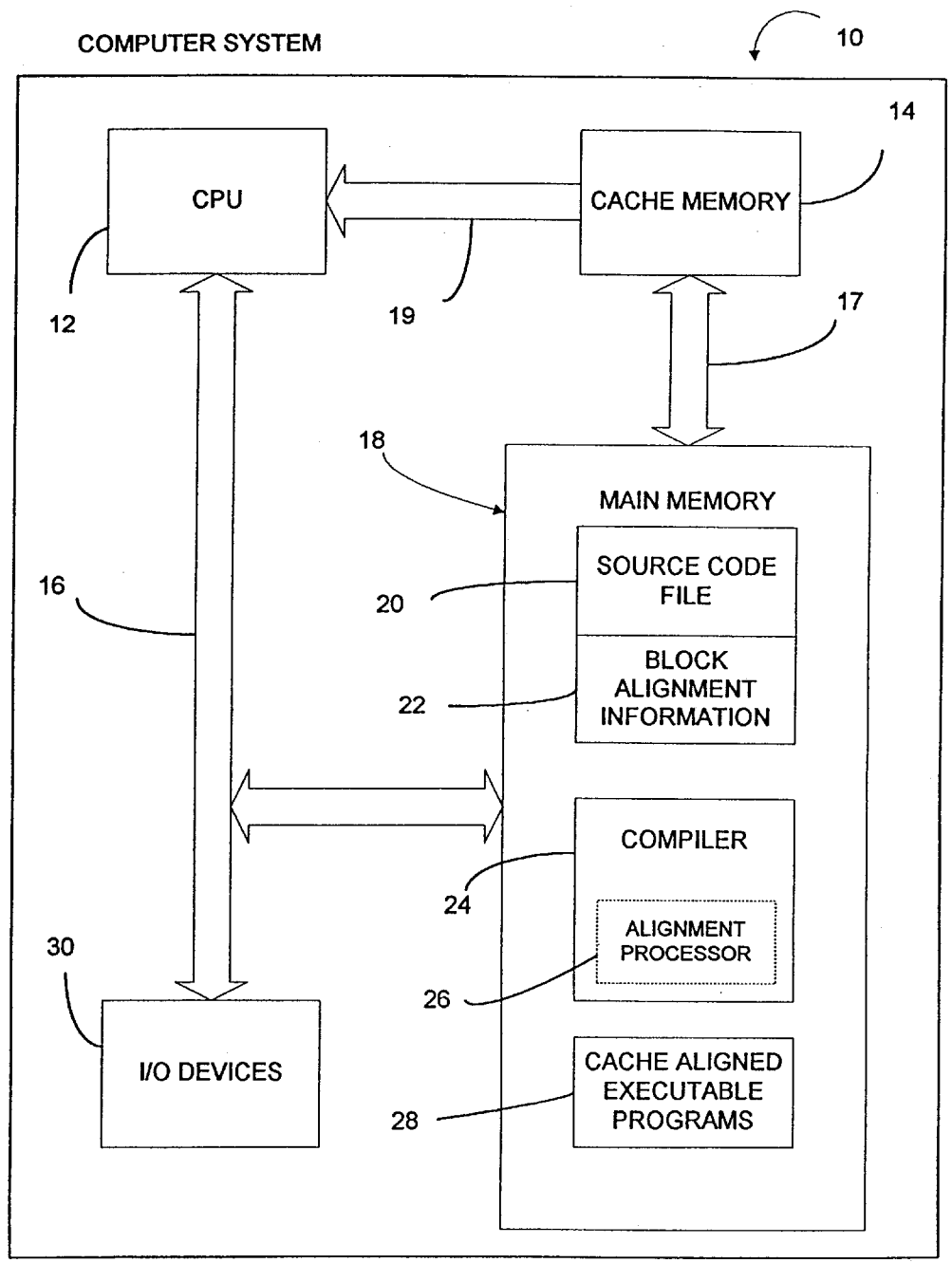
FIG. 1 is a block diagram of a preferred embodiment of the computer system of the present invention.

As discussed in the Background section, efficient use of instruction cache memory continues to be a major concern for developers creating computer executable programs. "Cache pollution" is said to occur when the program causes instructions to be fetched into the cache which are never executed. This problem occurs during non-sequential program execution. When a program branches, the instructions associated with the target of that branch (i.e., the code block) may need to be loaded into the cache from main memory. However, since code blocks are generally contiguously placed within memory, there is no guarantee that the desired block will begin on a cache line boundary. Rather, it is more likely that the block will begin somewhere in the middle of a cache line. Therefore, potentially unwanted instructions from the textually previous block may "pollute" the cache line.

Code blocks which make up computer programs are constructed by compilers which interpret one or more programming languages. Like words written in English, a programming language is used to write a series of statements that have particular meaning to the drafter (i.e., the programmer). The programmer first drafts a computer program in human readable form (called source code) prescribed by the programming language, resulting in a source code instruction (or statement) stream. The programmer then uses mechanisms that change the human readable form of the computer program into a form that can be understood by a computer system (called machine readable form, or object code). These mechanisms are typically called compilers; however, it should be understood that the term "compiler," as used within this specification, generically refers to any mechanism that transforms one representation of a computer program into another representation of that program.

This machine readable form, within this specification, is a stream of binary instructions (i.e., ones and zeros) that are meaningful to the computer. The compiler typically compiles each human readable statement into one or more machine readable instructions. Compilers generally translate each human readable statement in the source code instruction stream into one or more intermediate language instructions, which are then converted into corresponding machine-readable instructions. Special compilers, called optimizing compilers, typically operate on the intermediate language instruction stream to make it perform better (e.g., by eliminating unneeded instructions, etc.). Some optimizing compilers are wholly separate while others are built into a primary compiler (i.e., the compiler that converts the human readable statements into machine readable form) to form a multi-pass compiler. In other words, multi-pass compilers first operate to convert source code into an instruction stream in an intermediate language understood only by the compiler (i.e., as a first pass or stage) and then operate on the intermediate language instruction stream to optimize it and convert it into machine readable form (i.e., as a second pass or stage).

A compiler may reside within the memory of the computer which will be used to execute the object code, or may reside on a separate computer system. Compilers that reside on one computer system and are used to generate machine code for other computer systems are typically called "cross compilers." The methods and apparatus discussed herein apply to all types of compilers, including cross compilers.

One way to address the pollution problem is for the compiler to put certain branch targets on cache line boundaries. Each code block, or basic block, contains a set of machine instructions suitable for sequential execution. Each block also begins with a label, or branch target which essentially corresponds to the address at which the block will be stored in memory. Thus, since the compiler generates this information, it can be directed to locate certain code blocks at cache boundary lines.

Boundary, or cache alignment, as the aforementioned compiler technique is hereinafter referred, is not without its problems. The main problem includes the fact that it is wasteful to align unimportant branch targets on cache line boundaries. Instead, some judgment must be made to determine which code blocks should be boundary aligned. Ideally, only frequently executed blocks that are usually reached in a non-sequential manner should be aligned on a cache line boundary. Unfortunately, the compiler cannot make such decisions if it does not know which blocks are more or less likely to be executed. Current compiler techniques do not use information supplied about predicted execution frequencies to determine which code blocks should be aligned. The following detailed description describes a system and method wherein the compiler is provided with block execution information regarding the source code file it is then compiling. The compiler is then directed with specificity to cache align only those blocks deemed suitable, based on information supplied about predicted execution frequencies.

2. Detailed Description

Referring now to the drawings, FIG. 1 depicts a block diagram of a computer system pursuant to this invention. Those skilled in the art will appreciate the that mechanisms and apparatus of the present invention apply equally to any computer system, regardless of whether the computer system is a complicated multi-user computing apparatus or a single user workstation. As shown in FIG. 1, computer system 10 comprises central processing unit (CPU) 12 connected to main memory 18, input/output (I/O) devices 30, and cache memory 14. I/O devices 30 may include terminal interfaces, mass storage interfaces, and/or network interfaces. These system components are interconnected through the use of buses 16 and 19. Although computer system 10 is shown to contain only a single main CPU, it should be understood that the present invention applies equally to computer systems that have multiple CPU's.

Pursuant to this invention, main memory 18 is shown containing a source code file 20, block alignment information 22, a compiler 24, and cache aligned executable programs 28. Main memory may also contain an operating system and other application programs (not shown). Depicting programs and the like in main memory 18 should not be taken to mean that they are necessarily all completely and always contained in main memory 18. Rather, slower mass storage devices may be utilized to hold programs or data while they are awaiting processing or execution. Furthermore, those skilled in the art will recognize that programs and data need not reside on computer system 10, but could reside on another computer system and engage in cooperative processing through the use of well known client-server mechanisms.

In general, when a computer executable program is being executed by CPU 12, various parts of the program (i.e., lines of program instructions) are continuously being loaded out of main memory 18 and into cache memory 14 via bus 17. Cache memory 14 then delivers the instructions to the CPU 12 via bus 19 for execution. As previously noted, because cache memory 14 is faster, but smaller than main memory 18, it is most efficient to load only necessary program instructions into the cache memory 14. It should also be noted that although cache systems may be set up to handle program instructions or program data, the systems discussed herein are concerned primarily with those that handle instructions or a combination of instructions and data.

Efficient use of the cache memory 14 can be enhanced by effectively arranging or cache aligning the program instructions within an executable program. The present invention achieves enhanced efficiency by providing a compiler 24 with a built-in alignment processor 26 which can properly arrange program instructions to create cache aligned executable programs 28. The compiler 24 achieves this by not only processing source code file 20, but by also reading in and processing block alignment information 22.

It is important to note that while the present invention has been (and will continue to be) described in the context of a fully functional computer system, those skilled in the art will appreciate that the present invention is capable of being distributed as a program product via floppy disk, CD ROM, or any other form of recordable media or via any type of electronic transmission mechanism.

Figure 2:
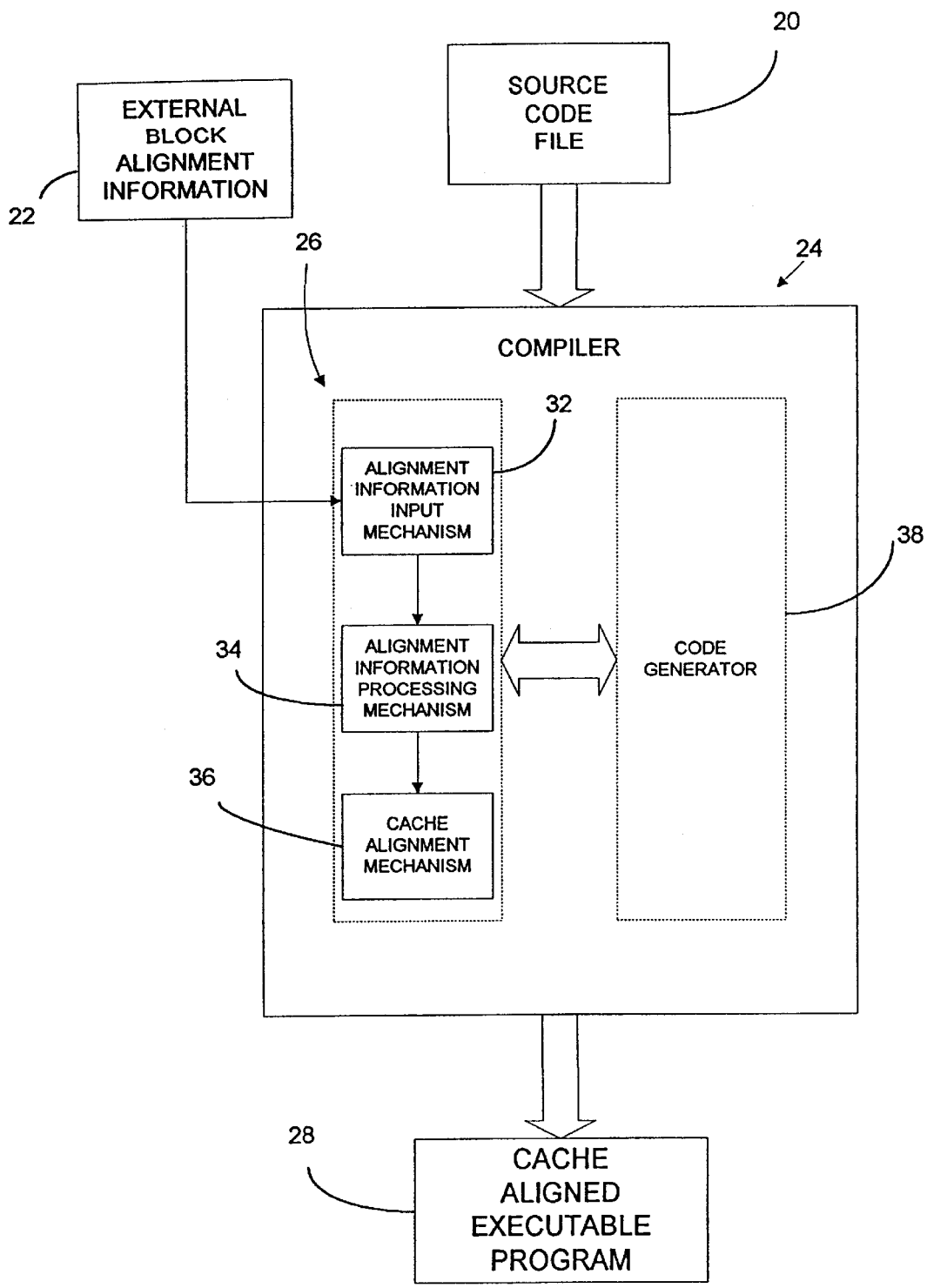
FIG. 2 is a block diagram of a preferred embodiment of the compiler program of the present invention.

Referring now to FIG. 2, a detailed block diagram of the compiler program 24 in accordance with this invention is shown. Compiler program 24 is capable of reading in source code file 20 and includes the typical compiler components, including code generator 38, necessary for the creation of an executable program. The term "code generator" is used here in its broadest sense and should not be limited to a specific compiler component. Rather, it is meant to cover some or all of the compiler components needed to generate a second instruction stream from a first instruction stream.

In addition to the standard compiler components, compiler 24 includes an alignment processor 26. Alignment processor 26 includes an alignment information input mechanism 32, an alignment information processing mechanism 34 and a cache alignment mechanism 36. Alignment information input mechanism 32 provides a means for inputting external block alignment information 22. External block alignment information 22 contains information specifically associated with the executable code created from source code file 20. In particular, the information found therein will determine which of the basic blocks created during compilation to cache align.

Figure 5:
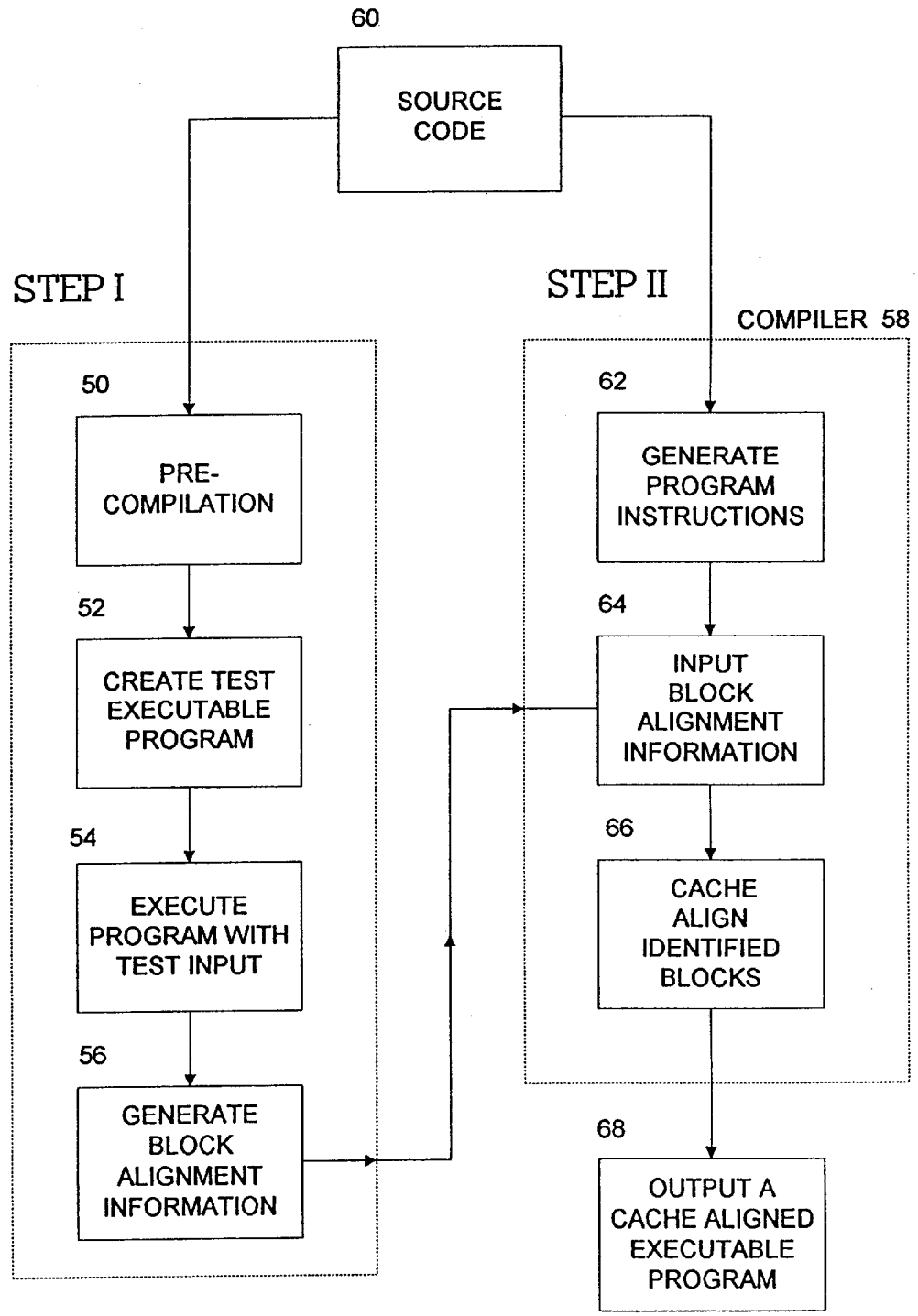
FIG. 5 is a flow diagram of a preferred embodiment that shows the steps required to generate a cache-aligned executable program in which predetermined external information is used by the compiler.

In one embodiment discussed later with reference to FIG. 5, "profiling" is used to decide what blocks should be cache aligned. A profile may contain block execution frequencies or edge weight execution frequencies generated from a sample execution with test inputs. A block execution frequency refers to the number of times a block gets executed during the execution of a program. An edge weight execution frequency refers to the number of times a particular path between two blocks is taken during execution—that is, how often control flows from the first block to the second.

The external block alignment information 22, however, is not limited to any particular format. It may be simply a list of basic blocks in a computer readable file, it may include execution frequency information or it may be information included in the source code file itself. Note, however, that it contains information that is "external" to the compiler. In other words, the decision about which basic blocks to cache align is guided by external block alignment information 22. Therefore, the programmer or some other external entity (such as a profile) provides information to the compiler to aid in making the alignment determination.

Once the compiler inputs the external block alignment information, the alignment information processing mechanism 34 processes the information. In a simple embodiment, processing will merely include reading a list of blocks for cache alignment and perhaps checking with the code generator to be sure that the identified blocks exist. Alternatively, the compiler may read a profile and decide to align blocks based on predicted execution frequencies from the profile. In another embodiment, processing may involve processing #pragma instructions in the source code which direct the compiler to boundary align blocks associated with various source code constructs. It is recognized that this invention is not limited to the methods described above, but rather, any combination, permutation, related method, or technique not yet known may be used. In addition, it should also be recognized that the alignment information processing mechanism 34 may contain its own logic capable of aiding the decision making process.

Finally, alignment mechanism 36 directs the code generator 38 to cache align those blocks identified by the alignment information processing mechanism 34. In a typical embodiment, alignment is accomplished by positioning the block to begin at the next cache line boundary in the instruction stream. This may leave a gap between the last instruction of the textually preceding block and the first instruction of the aligned block. If the preceding block does not end with an unconditional branch, control will "fall through" from the preceding block into the gap. There are two ways of preventing this—either the gap may be filled with no-op instructions, or the first instruction in the gap may be filled with an unconditional branch to the first instruction of the aligned block. A compiler may select either of these methods at each cache alignment opportunity. The result of these techniques is further illustrated and described in reference to FIGS. 3 and 4.

The output of the compiler is a cache boundary aligned executable 28. It is emphasized that the executable 28 contains certain blocks which are cache aligned and certain which are not. The decision as to which blocks to align is based upon external block alignment information 22 which contains information related to the actual source code file being compiled. This technique allows the compiler to reduce cache pollution and enhance cache efficiency based upon predicted execution information for the individual source file being compiled, rather than upon static observations about programs in general.

Figure 3:
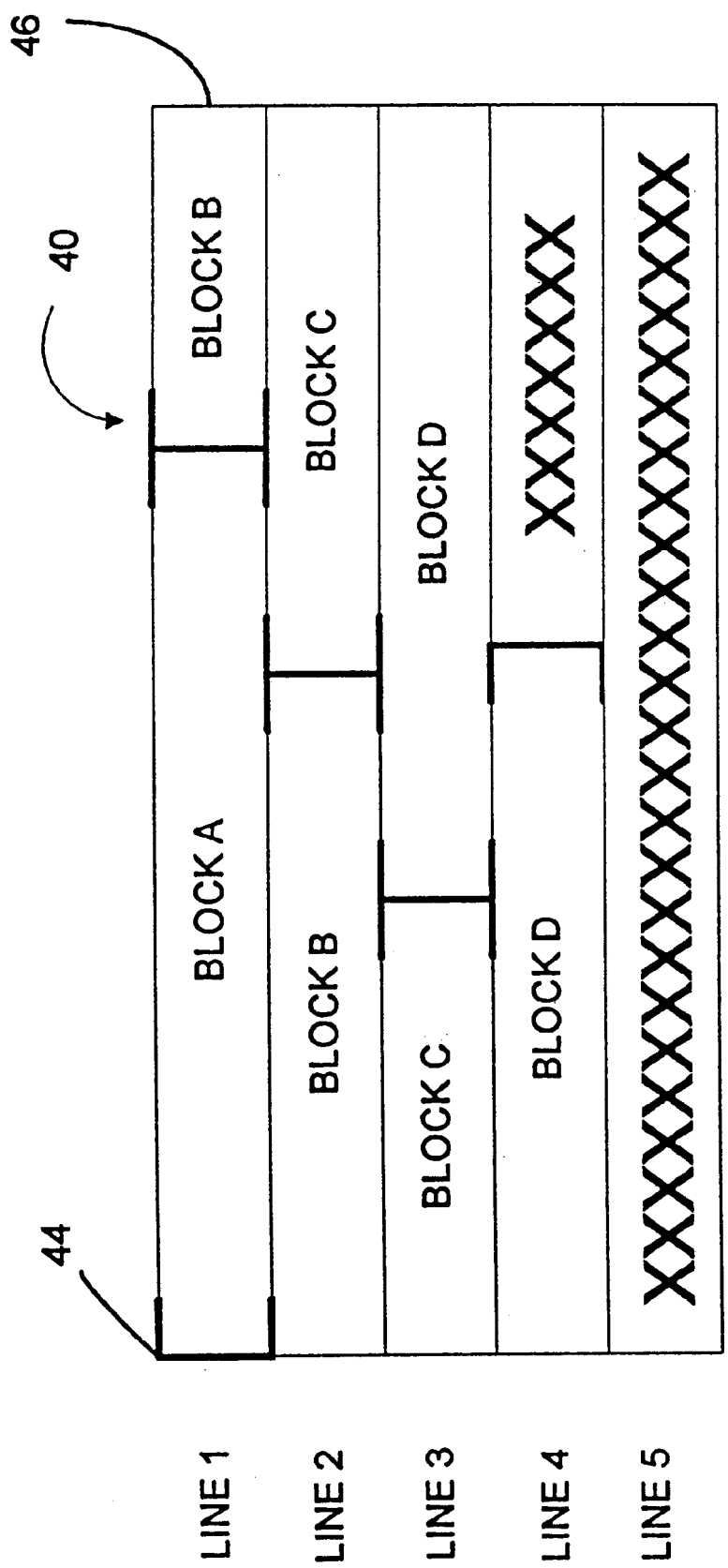
FIG. 3 is a graphical depiction of cache memory in which blocks are not aligned on cache line boundaries.
Figure 4:
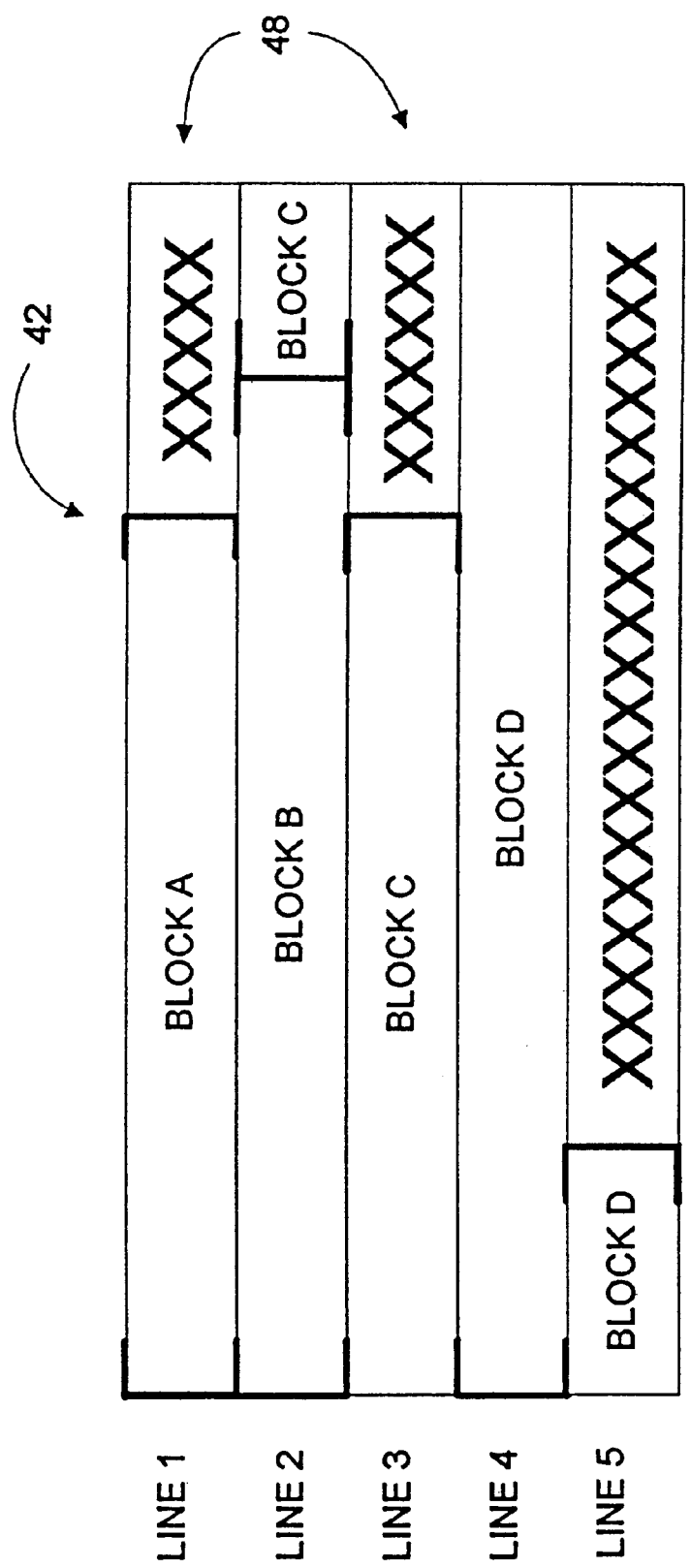
FIG. 4 is a graphical depiction of cache memory in which certain blocks are aligned on cache line boundaries.

Referring now to FIGS. 3 and 4, sample cache memories 40 and 42 are shown. Cache memory is arranged in lines 1–5. Each line has a beginning boundary 44 and an ending boundary 46. Line 1 represents the next line of instructions to be fed into the CPU for execution, followed by line 2 etc. As shown in FIG. 3, BLOCKS A–D are contiguously arranged such that BLOCK B follows BLOCK A, BLOCK C follows BLOCK B, etc. This arrangement works well when BLOCK A is branched to from a distant block and BLOCK A then branches to BLOCK B which in turn branches to BLOCK C which in turn branches to BLOCK D. In that situation, all of the necessary blocks would be loaded into the cache and be available for execution.

However, if BLOCK B is branched to by a distant BLOCK Z (not shown), rather than by BLOCK A, BLOCK A will still get loaded into the cache since it makes up the beginning part of the line on which BLOCK B resides. This is true even though BLOCK A may not be executed in the near future, in which case the result would be cache pollution. The same is true under the case where BLOCK D gets branched to from BLOCK Z. Similarly, part of BLOCK C may be loaded into the cache even though it may never get executed.

Referring now to FIG. 4, cache memory 42 is shown with BLOCKS A, B and D aligned on cache line boundaries. Thus, when BLOCKS A, B and D get branched to from a distant block (e.g., BLOCK Z), cache pollution will be eliminated since those blocks begin on cache line boundaries 44. This is accomplished by inserting padding 48 at the ends of the cache lines containing BLOCKS A and C. Although this achieves a reduction in cache pollution, it is clear that such a system is not without its drawbacks. It can be seen that by inserting padding 48, more cache is now required to hold the same amount of blocks. With padding, a fifth line of cache is required as opposed to only four when padding was not used. Additionally, by causing blocks to be cache aligned, the size of the program increases thereby creating increased demands upon main memory and disk space. Thus, efficiency dictates that cache alignment should only occur with "critical" blocks. Although under the scope of this patent the determination of which blocks are "critical" can be left up to the developer, a preferred method is discussed herein below.

Under the preferred embodiment of determining which blocks to align, profile information is collected about each block by examining two factors. The two factors include 1) the number of times each block is executed (block weight) and 2) how often each path leading to the execution of each block was traveled (edge weight). Once this profile information is collected, it can later be compared to threshold values to determine which blocks make good candidates for block alignment.

More specifically, the method of finding critical blocks requires the following inquiry for each block. First, is the block a frequently executed block, and second, does the block usually receive control from some block other than its textual predecessor? The second step of this inquiry ensures that groups of frequently executed contiguous blocks which pass control sequentially to each other do not each get cache aligned. Thus, even if the block is identified as a frequently executed block (e.g., BLOCK C of FIG. 4), it should not be aligned if the prior block (e.g., BLOCK B) usually passes control to the identified block (i.e., because BLOCK C usually receives control from BLOCK B, its textual predecessor, alignment is not necessary). The reason is that BLOCK B will likely not constitute pollution since it is often executed with BLOCK C and therefore is typically required to be in the cache at the same time as BLOCK C. Thus, determining which blocks are "critical" involves not only examining the execution frequency of the block in question, but may also require examining the frequency of the paths through which control flows to the identified block.

As noted above, the present system and method allow an external entity to identify the critical blocks and then provide them to the compiler as external block alignment information. Thus, a two-step methodology is provided that includes I) a Block Information Generation Step and II) a Compilation Step. FIG. 5 discloses a profiling system as one possible methodology that incorporates this two-step process.

Step I first includes a precompilation step 50 wherein source code 60 gets compiled to create a test executable program 52. At this point, test executable program 52 has no blocks which have been forced to cache line boundaries. Next, test executable program 52 is executed with test inputs 54. Test inputs may be chosen to simulate the typical environment the program will be run under. The result from the execution of test executable program 52 is the generation of block alignment information 56. Generated block alignment information may include a "profile" of the executed program revealing how often program blocks were executed. It may also include "edge weight" information regarding frequently traveled execution paths. Under the preferred embodiment, the profile will identify frequently executed blocks that are usually reached in a non-sequential manner (as discussed above with reference to FIG. 4). The profile may then assign a profile value for each block based on such information.

It is important to recognize that the above method of generating block alignment information represents one possible method of identifying critical blocks. For instance, if the developer knows from experience or otherwise which blocks are going to be critical, profiling may not be necessary. In this case the programmer could use "in-line" constructs, which are commands the programmer can put directly in the source code, to tell the compiler which pieces of code may be critical. An example of such a construct would be "#pragma align" which could direct the compiler to put the code block associated with source code following the construct on a cache line boundary. An alternative method would be to use multiple "#pragma" constructs thereby allowing programmers to flag areas that they believe are very frequently executed, somewhat frequently executed, very infrequently executed, etc. Based upon the information supplied by these pragmas, the compiler could derive predicted execution frequencies for each basic block. The compiler could then use these frequencies as input to a compiler alignment heuristic.

Furthermore, the developer may want to utilize a user-defined heuristic algorithm to determine cache alignment schemes. For instance, the developer may want to cache align all blocks that result from a "true" result in an if-then-else statement. It should also be recognized that the format of the block alignment information can change or be manipulated to suit the needs of the compiler.

Under Step II, source code 60 is again compiled to generate program instructions 62. However, in this case, compiler 58 also inputs the block alignment information 64 created under Step I. The compiler then cache aligns those blocks identified in the block alignment information 56. Finally, the compiler outputs a cache aligned executable program 68. It is recognized that the order and method in which the compiler reads in the source code and block alignment information, generates program instructions and blocks, and cache aligns identified blocks is not critical. Any known or discovered method may be utilized.

While the aforementioned description is drawn toward traditional cache systems, it is recognized that this invention could be used with other types of caches, such as those that employ "sublines" (i.e., cache systems that divide their lines into sublines). Thus, this system and method could be used to align blocks on sub-line boundaries or some other type of boundary.

The embodiment and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in the light of the above teaching without departing from the spirit and scope of the following claims.

We claim:

1. A computer system, said computer system comprising:
    a bus;
    a central processing unit;
    computer system memory, said computer system memory being connected to said central processing unit via said bus; and
    a compiler program stored in said computer system memory for execution on said central processing unit, said compiler program including:
        a code generator that converts a source code file into an object file, wherein said object file includes a plurality of basic blocks;
        a block alignment information input mechanism that inputs block alignment information from a source external to both said source code file and said compiler program; and
        a block alignment processing mechanism that processes said external block alignment information and aligns certain of said plurality of basic blocks on a cache line boundary.

2. The computer system of claim 1 wherein said external block alignment information includes a list of said plurality of basic blocks suitable for cache alignment.

3. The computer system of claim 2 wherein said list of said plurality of basic blocks suitable for cache alignment is determined by a profile.

4. The computer system of claim 3 wherein said profile includes block execution frequency information.

5. The computer system of claim 3 wherein said profile includes edge weight execution frequency information.

6. The computer system of claim 2 wherein said list of said plurality of basic blocks suitable for cache alignment is determined by a heuristic algorithm.

7. The computer system of claim 2 wherein said list of said plurality of basic blocks suitable for cache alignment is user-defined.

8. A method for creating a second instruction stream from a first instruction stream wherein said second instruction stream includes program instructions arranged in a plurality of basic blocks, and wherein certain of said plurality of basic blocks are aligned on a cache line boundary, the method comprising the steps of:
generating block alignment information; and
compiling said first instruction stream, said compiling step to include the steps of:
inputting said block alignment information from a source external to a compiler;
processing said block alignment information to determine which of said plurality of basic blocks to align; and
aligning at least one of said plurality of basic blocks on said cache line boundary.

9. The method of claim 8 wherein the step of generating block alignment information includes the steps of:
precompiling said first instruction stream to generate an executable file;
executing said executable file with a set of test inputs; and
generating a profile from said execution step, said profile including basic block execution frequencies.

10. The method of claim 8 wherein said block alignment information generating step includes the steps of:
precompiling said first instruction stream to generate an executable file;
executing said executable file with a set of test inputs; and
generating a profile from said execution step, said profile including edge weight execution frequencies.

11. The method of claim 8 wherein said step of processing block alignment information includes the steps of:
examining an execution frequency for each block;
comparing said execution frequency of each block to a first threshold value; and
for those blocks whose execution frequency exceeds said first threshold value, performing the steps of:
examining edge weight frequency information concerning how often control passed to those blocks from a textual predecessor block;
comparing said edge weight execution frequency to a second threshold value; and
identifying those blocks whose edge weight execution frequency did not exceed said second threshold value as candidates for cache alignment.

12. A program product, said program product comprising:
a recordable media; and
a compiler recorded on said recordable media accessible by a computer system for execution on a central processing unit, said compiler having:
a code generator, said code generator converting a first instruction stream into a second instruction stream wherein said second instruction stream includes a plurality of basic blocks;
a block alignment information inputting system, said inputting system reading in external block alignment information related to said plurality of basic blocks;
a block alignment information processing mechanism, said processing mechanism processing said external block alignment information related to said plurality of basic blocks; and
a block alignment mechanism, said alignment mechanism aligning certain of said plurality of basic blocks on a cache line boundary.

13. The program product of claim 12 wherein said external block alignment information related to said plurality of basic blocks includes a profile based upon block execution frequencies.

14. The program product of claim 12 wherein said external block alignment information related to said plurality of basic blocks includes a profile based upon edge weight execution frequencies.

15. The program product of claim 12 wherein said external block alignment information related to said plurality of basic blocks is user defined.

16. A computer system, said computer system comprising:
a bus;
a central processing unit;
computer system memory, said computer system memory being connected to said central processing unit via said bus; and
a compiler program stored in said computer system memory that executes on said central processing unit, said compiler program including:
a code generator that converts a first instruction stream into a second instruction stream wherein said second instruction stream includes said plurality of basic blocks;
a block profile processing system, said system including an inputting mechanism that inputs a unique file of profile information related to execution frequencies of said plurality of basic blocks, wherein said unique file of profile information resides within said computer system memory apart from said first instruction stream; and
a cache boundary block alignment mechanism.

17. The computer system of claim 16 wherein said profile information includes a subset list of said plurality of basic blocks suitable for cache alignment.

18. The computer system of claim 16 wherein said profile information includes block execution frequencies.

19. The computer system of claim 16 wherein said profile information includes edge weight execution frequencies.

20. The computer system of claim 16 wherein said profile information is user-defined.

21. The computer system of claim 16 wherein said cache boundary block alignment mechanism includes a padding system for inserting no-op instructions into said second instruction stream.

22. A compiler method for generating from a first instruction stream a second instruction stream and for aligning certain instructions within the second instruction stream along the boundaries of an instruction cache, the method comprising the steps of:
precompiling said first instruction stream to generate an executable file;
executing said executable file with a set of test inputs to generate an output profile;
storing said output profile in a unique file apart from said first instruction stream; and
compiling said first instruction stream, said compilation step comprising the steps of:
inputting said first instruction stream;
generating said second instruction stream such that it is arranged into a plurality of basic blocks, each basic block containing a set of program instructions that will be executed sequentially;
inputting said output profile contained in said unique file;

identifying from said output profile which of said plurality of basic blocks are to be boundary-aligned in the instruction cache; and inserting instructions in the second instruction stream to align at least one of the identified basic blocks to a boundary of the instruction cache.

23. The compiler method of claim 22 wherein said output profile includes block execution frequency information.

24. The compiler method of claim 22 wherein said output profile includes edge weight execution frequency information.

25. The compiler method of claim 22 wherein said inserting step includes padding the end of a first basic block with no-op instructions to force a subsequent basic block to be boundary aligned.

26. The compiler method of claim 22 wherein said identifying step includes the steps of:

examining an execution frequency for each basic block from said output profile;

comparing said execution frequency of each basic block to a first threshold value; and for those basic blocks whose execution frequency exceeds said first threshold value, performing the steps of:

examining edge weight frequency information concerning how often control passed to those basic blocks from a textual predecessor basic block;

comparing said edge weight execution frequency to a second threshold value; and identifying those basic blocks whose edge weight execution frequency did not exceed said second threshold value as candidates for cache alignment.

27. A compiler method for generating from a first instruction stream a second instruction stream wherein said second instruction stream comprises a plurality of basic blocks and for identifying which of said plurality of basic blocks to cache align in said second instruction stream comprising the steps of:

generating a profile to include a block execution frequency for each basic block and an edge weight execution frequency for each path traveled between said plurality of basic blocks;

comparing said block execution frequency of each basic block to a first threshold value; and determining how often control passed to each basic block from a textual predecessor basic block and comparing it to a second threshold value; and identifying candidates for cache alignment based upon comparisons to said first and second threshold values.

28. The compiler method of claim 27 wherein said step of generating a profile includes the steps of:

precompiling said first instruction stream to generate an executable file; and executing said executable file with a set of test inputs to generate an output profile.

29. A program product, said program product comprising:

a media; and a compiler recorded on said media accessible by a computer system for execution on a central processing unit, said compiler having:

a code generator that converts a first instruction stream into a second instruction stream wherein said second instruction stream includes a plurality of basic blocks; and an alignment processor wherein said alignment processor includes an alignment information input mechanism that reads in external block alignment information and a cache alignment mechanism that places at least one of said plurality of basic blocks on a cache line boundary.

30. The program product of claim 29 wherein said compiler further comprises an alignment information processing mechanism.

31. The program product of claim 29 wherein said external block alignment information includes block execution frequencies of said plurality of basic blocks.

32. The program product of claim 29 wherein said external block alignment information includes edge weight execution frequencies regarding said plurality of basic blocks.

33. The program product of claim 29 wherein said media comprises a recordable media.

34. The program product of claim 29 wherein said media comprises a transmission media.

* * * * *